United States Patent [19]

Saito et al.

[11] Patent Number: 4,806,335

[45] Date of Patent: Feb. 21, 1989

[54] PROCESS FOR PRODUCING ACICULAR IRON α-OXYHYDROXIDE PARTICLE POWDER

[75] Inventors: Masayoshi Saito; Jiro I, both of Minamata, Japan

[73] Assignee: Chisso Corporation, Japan

[21] Appl. No.: 119,635

[22] Filed: Nov. 12, 1987

[30] Foreign Application Priority Data

Nov. 22, 1986 [JP] Japan ............................... 61-279201

[51] Int. Cl.$^4$ ............................................. C01G 45/02
[52] U.S. Cl. .................................... 423/632; 423/633; 423/634
[58] Field of Search ........................ 423/632, 633, 634

[56] References Cited

U.S. PATENT DOCUMENTS

| 4,073,878 | 2/1978 | Otsuki et al. | 423/633 |
| 4,597,958 | 7/1986 | Takagi et al. | 423/632 |

FOREIGN PATENT DOCUMENTS

| 2541948 | 3/1977 | Fed. Rep. of Germany | 423/633 |
| 55-167135 | 12/1980 | Japan | 423/632 |
| 56-22638 | 3/1981 | Japan | 423/632 |
| 59-57917 | 4/1984 | Japan | |
| 60-90830 | 5/1985 | Japan | 423/632 |
| 61-186225 | 8/1986 | Japan | 423/632 |

OTHER PUBLICATIONS

*The Elements of Chemistry*, No. 9, 1985, Edited by Japan Chemical Society, "Inorganic Reactions Related to Solids", p. 72.

Primary Examiner—Robert L. Stoll
Assistant Examiner—Adriana L. Eng
Attorney, Agent, or Firm—Leydig, Voit & Mayer

[57] ABSTRACT

A process for producing acicular α-FeOOH particle powder having a narrow particle size distribution and a rectified shape and being highly dispersed is provided, which process comprises mixing with stirring an aqueous solution of a Fe(II) salt with an aqueous solution of an alkali in an equivalent ratio of alkali to Fe(II) salt of 1.5 or more, oxidizing the mixture with a $O_2$-containing gas, heat treating the resulting suspension of iron α-FeOOH particle powder to 60° to 100° C., further adding an aqueous solution of a FE(II) salt in a proportion of atom to molecule of Fe(II)/α-FeOOH of 0.5 to 10% and again oxidizing the mixture with a $O_2$-containing gas at 35° to 55° C.

6 Claims, 3 Drawing Sheets

1μm

1μm

1μm

PROCESS FOR PRODUCING ACICULAR IRON α-OXYHYDROXIDE PARTICLE POWDER

BACKGROUND OF THE INVENTION

1. Field of the Invention

This invention relates to a process for producing an acicular iron α-oxyhydroxide used as a starting raw material for acicular iron oxide and metal iron powder for magnetic recording.

2. Description of the Related Art

As to recent magnetic recording, a further higher level of magnetic characteristics and dispersibility has come to be required for magnetic powder for magnetic recording, with its higher performance and more compactness. In order to satisfy such requirements, it is necessary to improve the characteristics of iron α-oxyhydroxide particle powder, i.e. its dispersibility, particle shape and particle size distribution.

Conventional iron α-oxyhydroxide is unsatisfactory in the aspect of the dispersibility of each particle, i.e., preparation of single particle, dendritic particles are observed and a large amount of fine particles is present in a product so that its particle size distribution has been broad. Thus, since the magnetic tape prepared using such magnetic powder particles is inferior in its dispersibility in magnetic paints and has dendritic particles in admixture, it is inferior in the degree of orientation, low in the remanent induction and broad in the particle size distribution so that its erasion transfer characteristics have been inferior.

SUMMARY OF THE INVENTION

The object of the present invention is to provide a process for producing an iron α-oxyhydroxide particle powder which inhibits the formation of dendritic particles and fine particles to the utmost, having a narrow particle size distribution and being highly dispersed.

The present invention resides in:

a process for producing an iron α-oxyhydroxide particle powder, which comprises mixing with stirring an aqueous solution of a ferrous salt with an aqueous solution of an alkali in an equivalent ratio of the alkali to the ferrous salt of 1.5 or more, followed by subjecting the mixture to a first oxidation reaction with an oxygen-containing gas, heat-treating the resulting suspension of iron α-oxyhydroxide particle powder as it is, to a higher temperature of 60° to 100° C., further adding to the resulting suspension, an aqueous solution of a ferrous salt in a proportion of atom to molecule of Fe(II)/α-FeOOH of 0.5 to 10% and subjecting the mixture to a second oxidation reaction with an oxygen-containing gas at 35° to 55° C.

DETAILED DESCRIPTION OF PREFERRED EMBODIMENTS

Figure 1:
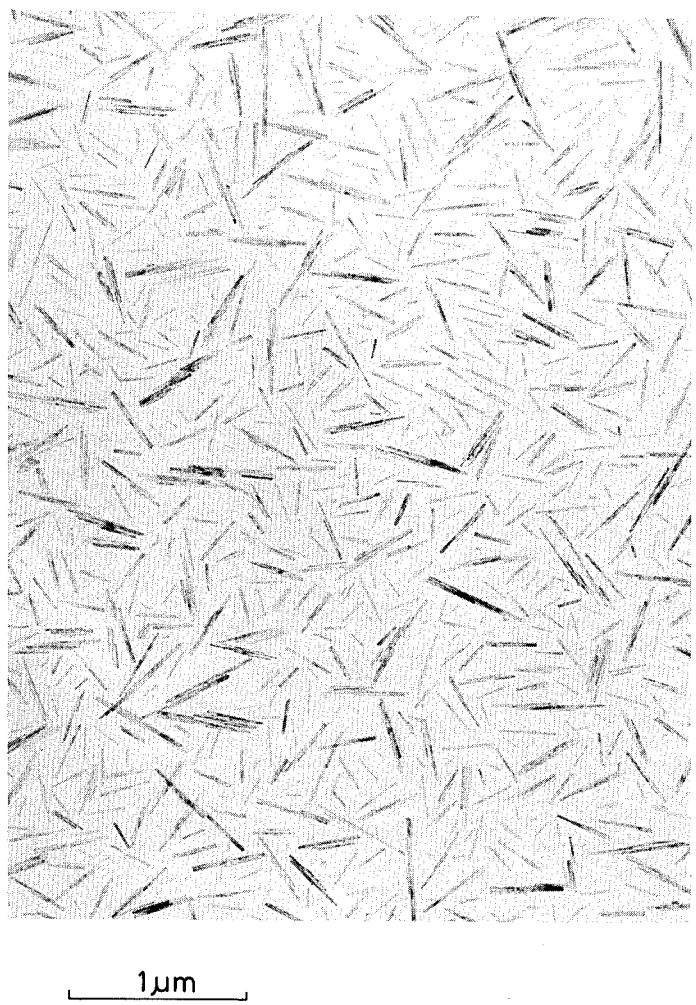
FIG. 1 shows a photograph under a transmission electron microscope, of acicular iron α-oxyhydroxide obtained by the steps (1), (2) and (3) of Example 1.

The above-mentioned ferrous salt in the aqueous solution thereof may be a ferrous salt such as ferrous sulfate, ferrous chloride, etc. As the alkali in the aqueous solution thereof, sodium hydroxide, potassium hydroxide, ammonia, etc. may be used. The oxygen-containing gas may be represented by air, but air diluted with an inert gas may also be used.

In the process of the present invention, the aqueous solution of an alkali is mixed with the aqueous solution of a ferrous salt so that the equivalent ratio of an alkali to an ferrous salt, that is the ratio of the alkali gram equivalent/$Fe^{2+}$ gram equivalent may be 1.5 or higher, preferably 2.0 or more. The oxidation temperature is preferably in the range of 10° to 35° C. If the alkali equivalent ratio is less than 1.5, magnetite is liable to be present in admixture and iron α-oxyhydroxide in the form of dendritic particles is liable to be formed; hence such lower ratios are undesirable. Further, if the oxidation temperature is too low, the oxidation reaction requires a long time, while if it is too high, the crystal growth is too rapid so that the resulting particles are too large to correspond to the demand for preparing fine particles as a whole.

Next, the suspension of the iron α-oxyhydroxide obtained in the above step is heat-treated at a high temperature of 60° to 100° C. In this heat treatment of the suspension, the higher the temperature, preferably at 80° C. or higher, and the higher the alkali concentration, the higher the solubility of iron α-oxyhydroxide particles; hence the effectiveness of the treatment is enhanced. Namely, the number of fine particles decrease, the minute branches of dendritic particles are extinct and main particles are rectified (that is, the pointed parts at the tip ends of particles are extinct and the size of particles becomes uniform), and bundled particles are broken up so that particles having a considerably improved particle dispersibility, particle shape and particle size distribution can be obtained. In addition, the time for heat treatment is preferably in the range of 6 to 12 hours, although it varies depending on the treating temperature, alkali concentration, particle size, etc. Further, in order to promote exhibition of the above-mentioned effectiveness, an alkali compound may be added in advance of the heat treatment. However, even when such a treatment is carried out, it cannot yet be said that the particles obtained are satisfactory for the desired object of the present invention. Namely, a certain amount of fine particles remain and singularization and rectification of the main particles are incomplete.

Thus, to the suspension is added an aqueous solution of a ferrous salt in an atom/molecule proportion of Fe(II)/α-FeOOH of 0.5 to 10%, preferably 1 to 5%, followed by subjecting the mixture to oxidation reaction with an oxygen-containing gas at a temperature of 35° to 55° C., preferably 40° to 50° C. If the oxidation reaction temperature is lower than 35° C., independent seed crystals of iron α-oxyhydroxide are formed, whereby fine particles of iron α-oxyhydroxide undesirably increase. If the oxidation reaction temperature is higher than 55° C., magnetite is liable to be formed; hence temperatures outside the range set out above are undesirable. As to the aqueous solution of a ferrous salt, if the atom/molecule proportion of Fe(II)/α-FeOOH is less than 0.5%, the effectiveness of dispersing particles, rectifying the shape thereof and narrowing the particle size distribution is insufficient, while if the proportion exceeds 10%, there is a fear that seed crystals and dendritic particles may be formed. Hence, proportions outside the range of 0.5 to 10% are undesirable.

By carrying out the above-mentioned additional reaction under the above conditions, main particles are accompanied with residual fine particles by adsorption and the resulting main particles are doped with pure iron α-oxyhydroxide on the surface thereof, whereby it is possible to obtain iron α-oxyhydroxide particle powder which is more satisfactory in the particle dispersibility, particle shape and particle size distribution As described above, the object of the present invention has been achieved by a combination of the heat treatment with the additional oxidation reaction. If either one of these steps is omitted, the object cannot be achieved.

The present invention will be described in more detail by way of Examples, but it should not be construed to be limited thereto.

EXAMPLE 1

(1) A 5% aqueous solution of ferrous sulfate (20 Kg) was mixed with stirring with a 30% aqueous solution of NaOH in an equivalent ratio of the alkali to ferrous sulfate of 5 (8.8 Kg), followed by blowing air at a rate of 20 l/min. into the mixed solution at 20° C. for 2 hours to obtain a slurry of iron α-oxyhydroxide.

Figure 3:
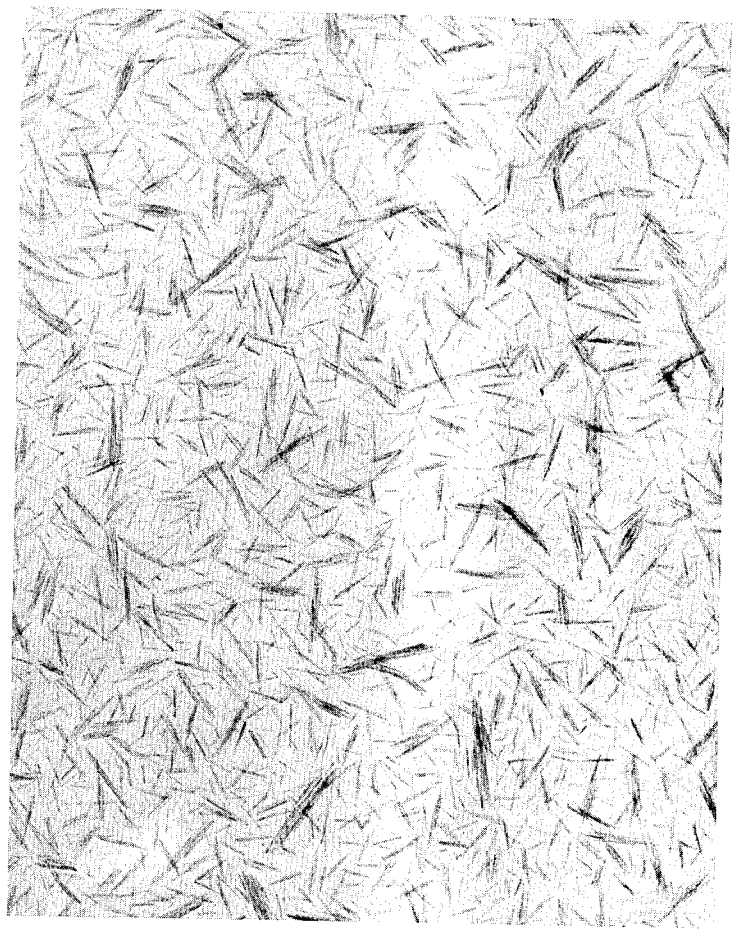
FIG. 3 shows one that obtained by the step (1) alone of Example 1.

A photograph under a transmission electron microscope, of iron α-oxyhydroxide particles at this step is shown in FIG. 3.

(2) Next, the slurry was heat-treated at 80° C. for 10 hours.

Figure 2:
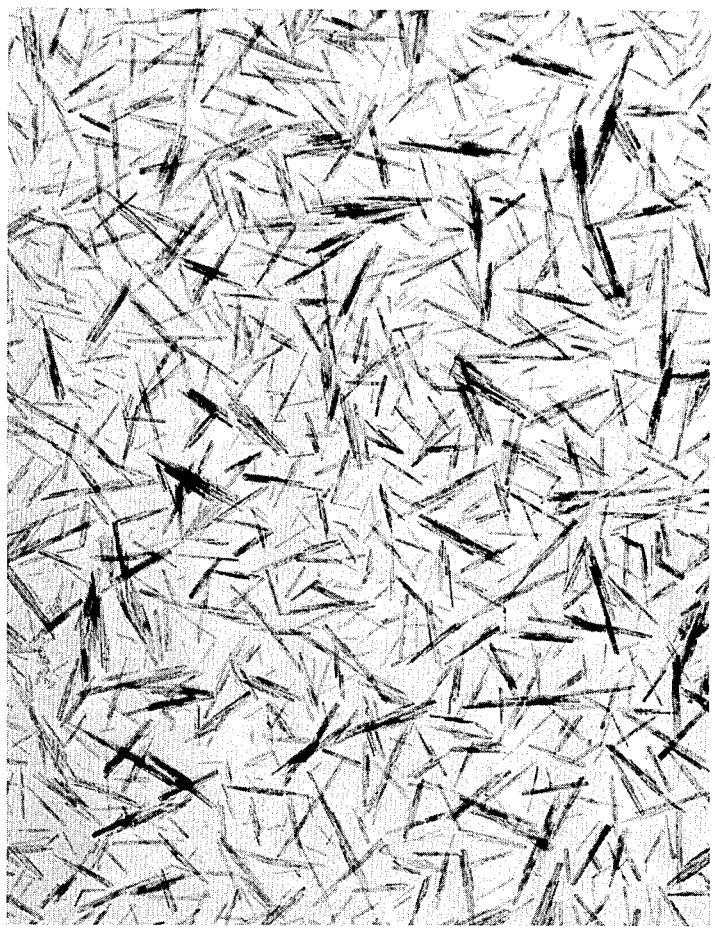
FIG. 2 shows one that obtained by the steps (1) and (2) of Example 1.

A photograph under a transmission electron microscope, of iron α-oxyhydroxide particles at this step is shown in FIG. 2.

(3) The temperature of the resulting slurry was decreased to 45° C., followed by adding thereto an aqueous solution of ferrous sulfate in an atom/molecule proportion of Fe(II)/α-FeOOH of 1% and then blowing air at a rate of 0.5 l/min. for 20 minutes.

A photograph under a transmission electron microscope, of iron α-oxyhydroxide at this step is shown in FIG. 1.

One hundred of the resulting iron α-oxyhydroxide particles were then measured under a transmission electron microscope. The average length of the major axis was 0.45 μm, the standard deviation therefrom was 0.083 μm and the average length of the minor axis was 0.042 μm. The specific surface area was 70.2 m²/g. These results are shown in Table 1.

EXAMPLE 2

The steps (1), (2) and (3) of Example 1 were repeated except that the atom/molecule proportion of Fe(II)/α-FeOOH in the aqueous solution of ferrous sulfate added at the step (3) of Example 1 was changed to 3%, to obtain an iron α-oxyhydroxide. The results are shown in Table 1.

EXAMPLE 3

The steps (1), (2) and (3) of Example 1 were repeated except that the atom/molecule proportion of Fe(II)/α-FeOOH in the aqueous solution of ferrous sulfate added at the step (3) of Example 1 was changed to 8% to obtain an iron α-oxyhydroxide. The results are shown in Table 1.

COMPARATIVE EXAMPLE 1

Only the step (1) of Example 1 was carried out except that in the step (1), the amount of air blown was changed to 3 l/min. to obtain an iron α-oxyhydroxide. The results are shown in Table 1.

COMPARATIVE EXAMPLE 2

Only the steps (1) and (2) of Example 1 were carried out to obtain an iron α-oxyhydroxide. The results are shown in Table 1.

COMPARATIVE EXAMPLE 3

Only the steps (1) and (3) of Example 1 were carried out to obtain an iron α-oxyhydroxide, except that in the step (3), the atom/molecule proportion of Fe(II)/α-FeOOH in the aqueous solution of ferrous sulfate was changed to 6%. The results are shown in Table 1.

TABLE 1

| | Heat treatment | | Quantity of ferrous salt | Particle size | | | Specific surface area (m²/g) |
|---|---|---|---|---|---|---|---|
| | Temperature (°C.) | Time (Hr) | Fe (II)/α-FeOOH (%) | Major axis (μm) | Standard deviation of size of major axis (μm) | Minor axis (μm) | |
| Example 1 | 80 | 10 | 1 | 0.45 | 0.083 | 0.042 | 70.2 |
| Example 2 | 80 | 10 | 3 | 0.47 | 0.080 | 0.049 | 66.8 |
| Example 3 | 80 | 10 | 8 | 0.49 | 0.082 | 0.051 | 64.0 |
| Comparative example 1 | None | None | None | 0.50 | 0.175 | 0.055 | 71.0 |
| Comparative example 2 | 80 | 10 | None | 0.43 | 0.112 | 0.039 | 72.4 |
| Comparative example 3 | None | None | 6 | 0.46 | 0.130 | 0.050 | 68.9 |

As apparent from Table 1 and FIGS. 1 to 3, according to the process of the present invention, dendritic particles and fine particles are almost not present in admixture so that acicular iron α-oxyhydroxide particle powder having a narrow particle size distribution, a rectified shape and a high dispersion is obtained.

What we claim is:

1. A process for producing an iron α-oxyhydroxide particle powder, which comprises mixing with stirring an aqueous solution of a ferrous salt with an aqueous solution of an alkali in an equivalent ratio of said alkali to said ferrous salt of 1.5 or more, followed by subjecting the mixture to a first oxidation reaction with an oxygen-containing gas, heat-treating the resulting suspension of iron α-oxyhydroxide particle powder as it is, to a temperature of 60° to 100° C., further adding to the resulting suspension an aqueous solution of a ferrous salt in a proportion of atom to molecule of Fe(II)/α-FeOOH of 0.5 to 10% and subjecting the mixture to a second oxidation reaction with an oxygen-containing gas at a temperature of 35° to 55° C.

2. A process according to claim 1 wherein said equivalent ratio of said alkali to said ferrous salt is 2.0 or more.

3. A process according to claim 1 wherein said first oxidation reaction is carried out at a temperature in the range of 10° to 35° C.

4. A process according to claim 1 wherein said heat-treating is carried out at a temperature in the range of 80° to 100° C.

5. A process according to claim 1 wherein said second oxidation reaction is carried out at a temperature in the range of 40° to 50° C.

6. A process according to claim 1 wherein said proportion of atom to molecule of Fe(II)/$\alpha$-FeOOH is in the range of 1 to 5%.

* * * * *